United States Patent [19]
Carlson

[11] Patent Number: 4,833,479
[45] Date of Patent: May 23, 1989

[54] DIGITAL POLY-PHASE PULSE COMPRESSOR

[75] Inventor: Eric J. Carlson, Mesa, Ariz.

[73] Assignee: Motorola, Inc., Schaumburg, Ill.

[21] Appl. No.: 171,078

[22] Filed: Mar. 21, 1988

[51] Int. Cl.$^4$ .............................................. G01S 13/28
[52] U.S. Cl. .................................... 342/194; 342/201
[58] Field of Search ................. 342/131, 132, 194, 201

[56] References Cited

U.S. PATENT DOCUMENTS

| | | |
|---|---|---|
| 3,680,105 | 7/1972 | Goldstone . |
| 3,747,099 | 7/1973 | Wong . |
| 4,237,461 | 12/1980 | Cantrell et al. . |
| 4,384,291 | 5/1983 | Lewis et al. . |
| 4,404,562 | 9/1983 | Kretschmer, Jr. et al. . |
| 4,521,779 | 6/1985 | Lewis . |

Primary Examiner—Thomas H. Tarcza
Assistant Examiner—Mark Hellner
Attorney, Agent, or Firm—Jordan C. Powell

[57] ABSTRACT

A digital poly phase pulse compressor that utilizes delay lines to separate KN samples of a received compressed pulse in I and Q channels, multiplies N of the KN samples with quadrature, weighted code phase signals by shifting and adding, cross couples the products of the shifting and adding in the I and Q channels to remove all code phase terms from the N samples in each channel, and combines the final n signals to provide I and Q compressed pulse components. The I and Q channels can be expanded into pluralities of channels to include compensation for Doppler shift.

17 Claims, 10 Drawing Sheets

DIGITAL POLY-PHASE PULSE COMPRESSOR

BACKGROUND OF THE INVENTION

The present invention pertains to pulse expansion/-pulse compression systems useable with poly-phase coding and in a Doppler environment and, further, to pulse compression systems included on a single semiconductor chip. Common bi-phase codes or digital samples of linear or non-linear chirp codes are included as subsets.

Many radar and data link applications require a pulse compression device in order to achieve increased pulse energy while simultaneously achieving improved target location accuracy. If no Doppler frequency shift is present in the application, it is common to apply bi-phase coded waveforms. However, these waveforms are sensitive to the presence of Doppler and the magnitude of the realized pulse compression value rapidly diminishes as the magnitude of the Doppler shift increases.

In order to overcome the imitations encountered by Doppler, it is common practice to apply linear frequency modulated (chirp) waveforms because they exhibit significant tolerance to the presence of Doppler. Up to now, the realization of the chirp waveform has been by means of an analog device, such as a Surface Acoustic Wave (SAW) filter. Unfortunately, SAWs are typically limited to pulse lengths of 50 microseconds or so, although longer pulse lengths can theoretically be handled by a series of individual SAW devices. This is a cumbersome implementation; especially complicated by the need to impose time-sidelobe weighting functions. Any change in any of the pulse compression parameters necessitates the design of a new SAW device.

At present a VHSIC convolver chip, identified as TVC901, is available from the TRW Corp. This chip can perform pulse compression of bi-phase coded waveforms. In a simplified description of the operation, the reference signal (code) is continuously fed in one chip per clock cycle so that at any point in time, the entire code appears on the chip. On the other hand, the input data samples are not stored in a tapped delay line, but are instantaneously correlated (multiplied) with all code chips on each clock cycle. The results are fed back to an output adder that is continuously "waterfalled" to provide the output for the last PCR clock cycles, where PCR is the pulse compression ratio. The convolution is performed by hardwired multiplies implemented with 2.5 bits $(0,+1,+2)$. The data is also single sampled.

SUMMARY OF THE INVENTION

The present invention pertains to digital poly-phase pulse compression apparatus for use in a system utilizing coded pulse expansion implementing KN digital samples during transmission, where K is a constant positive integer and N is the pulse compression ratio, the apparatus receiving expanded transmitted pulses and converting them to two, quadrature baseband analog signals to in-phase (I) and quadrature (Q) digital signals, storing weighted sine and cosine values in a memory, utilizing the stored, weighted sine and cosine values to shift and add each of the N I digital samples and each of the N Q digital samples (thus approximating multiplication by said weighted sine and cosine values) to provide N I pairs of quadrature functions and N Q pairs of quadrature functions, combining the N I pairs of quadrature functions with matching pairs of the N Q pairs of quadrature functions to provide I digital samples and Q digital samples with code phase terms eliminated, and adding the I digital samples from the combining step and the Q digital samples from the combining step to provide I and Q compressed pulse components. The weighted sine and cosine values may contain code phase terms and Doppler compensation terms and/or chirp weighting functions depending on their application.

It is an object of the present invention to provide a new and improved pulse compression system which is implemented on a single semiconductor chip.

It is a further object of the present invention to provide a new and improved pulse compression system which operates with a bi-phase, poly-phase, or chirp pulse expansion system.

It is a further object of the present invention to provide a new and improved pulse compression system which compensates for Doppler frequency shifts.

These and other objects of this invention will become apparent to those skilled in the art upon consideration of the following specification, claims and drawings.

DESCRIPTION OF THE PREFERRED EMBODIMETNS

Figure 1:
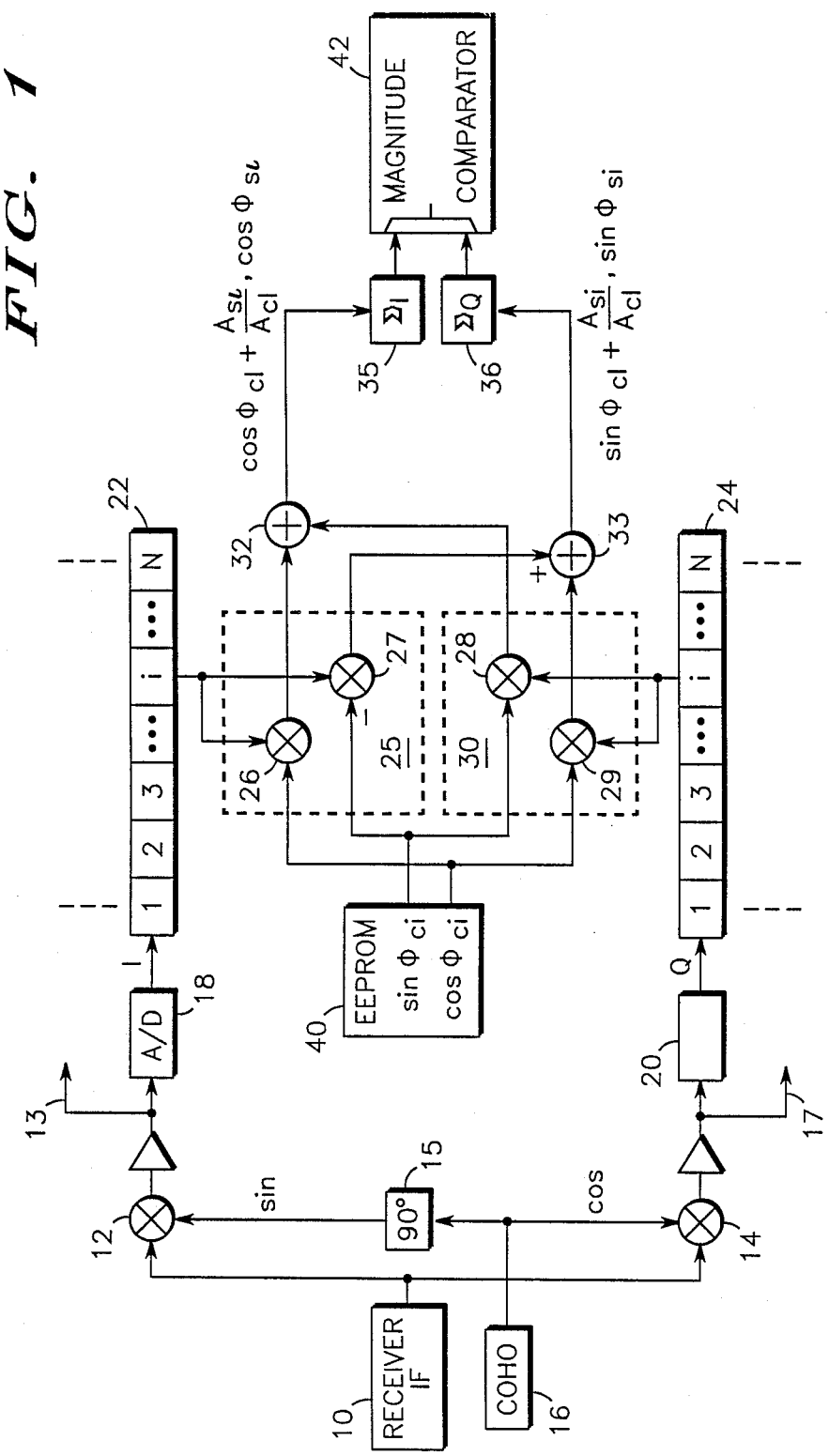
FIG. 1 is a simplified block diagram of a poly-phase pulse compressor containing portions of the present invention.

Referring specifically to FIG. 1, a simplified block diagram of a poly-phase pulse compressor containing portions of the present invention is illustrated. A receiver 10 supplies an IF signal to inputs of two mixers 12 and 14. A second input of mixer 12 is connected through a ninety degree phase shifting circuit 15 to the output of a coherent local oscillator 16, which output is also connected directly to a second input of mixer 14. The quadrature baseband analog signals from mixers 12 and 14 are supplied through amplifiers to in-phase (I) and quadrature (Q) analog-to-digital (A/D) converters 18 and 20, respectively. The digital signals from A/D converters 18 and 20 are supplied to two N stage delay lines 22 and 24, respectively. A pulse compression ratio of N implies the existence of an N-stage delay line in each channel. The digital samples from each stage of the N stage delay lines 22 and 24 are coupled to separate multiply and add circuits, only one of which is illustrated in FIG. 1, for convenience, and is illustrated as being coupled to the i th stages of delay lines 22 and 24.

The multiply and add circuit of FIG. 1 includes two correlator networks 25 and 30 each having two multipliers 26,27 and 28,29, respectively, two adding circuits 32 and 33, and two summation circuits 35 and 36. The output from the i th stage of I delay line 22 is connected to first inputs of multiplier 26 and multiplier 27. The output from the i th stage of Q delay line 24 is connected to first inputs of multipliers 28 and 29. Quadrature code phase signals are stored in a storage device 40. A first signal, sin $\theta_{ci}$, is connected to second inputs of multipliers 27 (negatively) and 28. A second signal from storage device 40, cos $\theta_{ci}$, is connected to second inputs of multipliers 26 and 29. The output of multiplier 26 and the matching output of multiplier 28 are cross coupled to inputs of adding circuit 32. The output of multiplier 29 and the matching output of multiplier 27 are cross coupled to inputs of adding circuit 33. The outputs of adding circuits 32 and 33 are connected to summing circuits 35 and 36, respectively. The N samples from each of the adding circuits coupled to I delay line 22 are linearly summed in summation circuit 35 and the N samples from each of the adding circuits coupled to Q delay line 24 are linearly summed in summation circuit 36.

It can be shown that the quadrature components of the signals at the outputs of mixers 12 and 14 have the following forms:

sin$\Omega$t terms:

$$\frac{Y_{ri}}{A_{rcl}} = \left[ \cos(\theta_{ci}) \left( \cos\theta_{cl} + \frac{A_{rs}}{A_{rcl}} \cos(\Omega_s t_i + \theta_{so}) \right) - \sin(\theta_{ci}) \left( \sin\theta_{cl} + \frac{A_{rs}}{A_{rcl}} \sin(\Omega_s t_i + \theta_{so}) \right) \right] \quad (1)$$

cos$\Omega$t terms:

$$\frac{Y_{ri}}{A_{rcl}} = \left[ \cos(\theta_{ci}) \left( \sin\theta_{cl} + \frac{A_{rs}}{A_{rcl}} \sin(\Omega_s t_i + \theta_{so}) \right) + \sin(\theta_{ci}) \left( \cos\theta_{cl} + \frac{A_{rs}}{A_{rcl}} \cos(\Omega_s t_i + \theta_{so}) \right) \right] \quad (2)$$

where subscripts c and s refer to clutter and signal, respectively, and i denotes the i th code chip. The arguments of the sine and cosine terms, of the form $\Omega_s t_i + \theta_{so}$, describe the target Doppler induced phase on the i th chip and the initial target phase, respectively, where $\Omega_s$ is the target Doppler frequency.

In the above equations, note that four clutter and signal terms are present, each being multiplied by the sine or cosine of the i th code phase. These terms are appropriately multiplied by code phase terms, sin $\theta_{ci}$ and cos $\theta_{ci}$, in multipliers 26 through 29 of FIG. 1 to obtain terms of the form $\sin^2\theta$ and $\cos^2\theta$. These terms are then cross coupled to adding circuits 32 and 33 so that matching terms are added to arrive at terms of the form $\sin^2\theta + \cos^2\theta$, which terms are identically equal to unity and can be ignored. Also, double angle terms sum to zero, leaving only terms which consist of clutter and target parameters. Thus, the pulse compressor multiplication (convolution) process has eliminated the pulse coding; that is, matched filtering has occurred. Note that the clutter phase term is repeatable pulse-to-pulse and the pulse compressor responds to the target by producing the peak response time-shifted from its zero Doppler position for a chirp waveform. Also note that the signal-to-clutter ratio modifies the desired target return; all realizations of the subject pulse compressor must incorporate enough dynamic range (expressed in bits) to retain this desired information.

All digital realizations of sampled analog signals experience a "cusping" loss. The loss can be reduced by oversampling the waveform. If the fundamental waveform is B Hz, where B describes the chirp bandwidth or the poly-phase code "chip" rate for instance, then the processor must sample the waveform at the rate kB Hz. Assuming a chirp bandwidth of B, then the sample period is 1/kB, where k is equal to unity, two, or three, etc.

Unity sampling is desirable because it leads to the lowest clock rates and the minimum amount of digital hardware. That is, if the pulse compression ratio is N, then k*N multipliers are required in the convolver as seen in FIG. 1. However, it is noted that target scenarios resulting in a doppler phase shift of 180i (i odd) degrees suffer from almost 4 dB of pulse compression loss when unity sampling is employed. The loss is steadily decreased as the sample rate is increased. For purposes of this disclosure, double sampling is assumed to be the desirable tradeoff between performance and required hardware; other choices remain within the claims of this disclosure.

If double sampling is assumed, two unfortunate results accrue: the clock rate of the processor is doubled and the amount of hardware (delay lines and multipliers) is also doubled. A technique of this invention allows most of the extra hardware to be eliminated.

It has been determined by insight and computer simulation that the receiver pulse compressor structure can implement exactly N correlator networks 25,30 if the pulse expansion networks implement exactly k*N digital samples of the subject waveform. This results in double sampling performance, but requires only single sampling hardware on the chip.

As an example, the digital equivalent of the analog chirp waveform when radiated must contain k*N phase samples taken from the typical quadratic phase trajectory that characterizes chirp modulation. The reduced "distance" between successive phase samples of the transmitted pulse acts in the nature of a phase matching "vernier" in the receiver. When Doppler is present, the best correlation position of the pulse is located in the vernier at a shifted phase position relative to the zero Doppler case.

However, the concept to be disclosed here, is that only every k th delay line tap in the receiver pulse compressor must be configured with a correlator network 25,30; if the delay line of FIG. 1 has 2*N taps, then only N taps are connected to the output summing networks 35,36. This realizes all of the benefits of multiple rate sampling, but requires a minimum of only N vector multiplies to achieve correlation As stated above, double rate sampling performance is achieved with the minimum amount of hardware on the chip.

Figure 2:
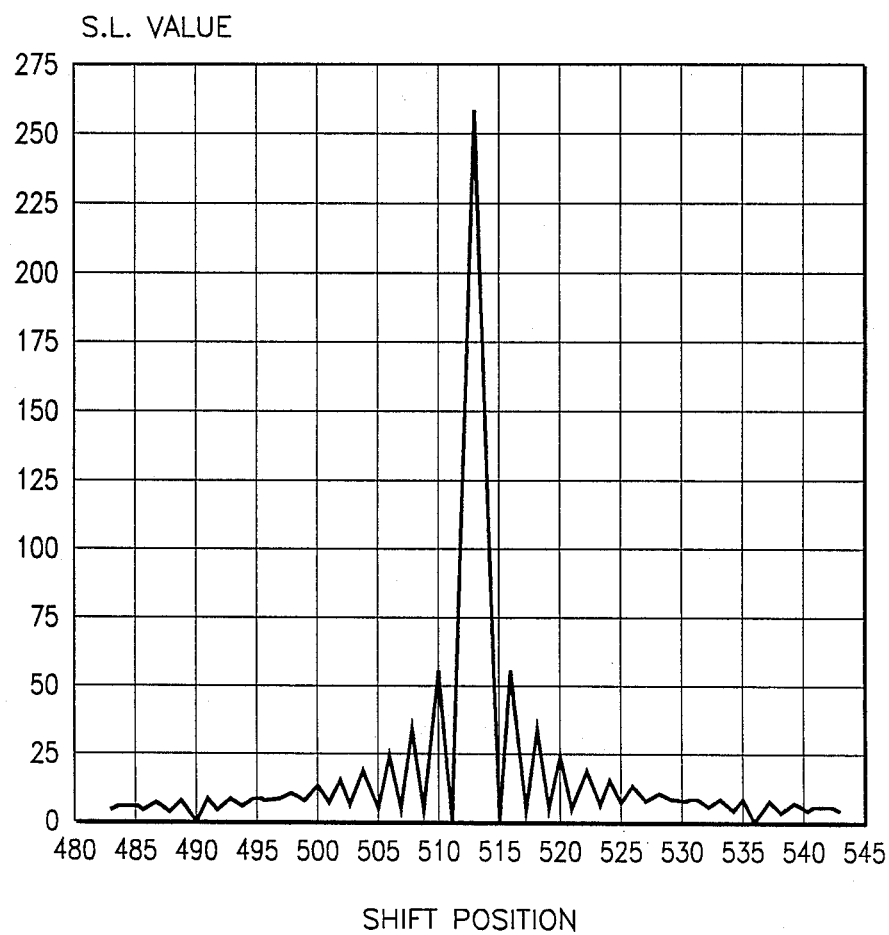
FIGS. 2-3 illustrate waveforms of pulses compressed by utilizing various portions of the present invention.

An example of a 256:1 digital chirp waveform pulse compressor is shown in FIG. 2. Here, the precision of the correlator networks 25,30 is assumed to be eight bits. The zero Doppler pulse position in the delay lines 22,24 is 2*256 with double rate sampling employed Note that the digital chirp equivalent waveform is compressed with the ideal sidelobe distribution, the first sidelobe being 13.4 dB down from the peak value. Of course, present analog (SAW) designs include some type of weighting function that acts to reduce sidelobe levels. Pulse weighting is achieved in the present digital structure without any increase in hardware on the chip.

It is known that the multiplication of two quantities in the time domain is equivalent to convolution in the frequency domain. This fact is commonly employed to reduce spectral leakage in FFT applications. The pulse compressor described in this disclosure is in fact a convolver, so the multiplication of the correlator functions:

$$\cos\theta_{cl} + \frac{A_{sl}}{A_{cl}} \cos\theta_{sl} \qquad (3)$$

$$\sin\theta_{cl} + \frac{A_{sl}}{A_{cl}} \sin\theta_{sl} \qquad (4)$$

by a weighting function acts to reduce the time sidelobes of the digital convolver when chirp applications are considered. Each of the N sine and cosine code phase signals are multiplied by the appropriate component of the desired weighting function. Each of these weighted sine and cosine code phase signals are then applied to the delay line taps of FIG. 1. These weighted sine and cosine code phase signals reside off chip in appropriately designed storage device 40, which may, for example, be ROMs (Read Only Memories) or similar device.

Figure 3:
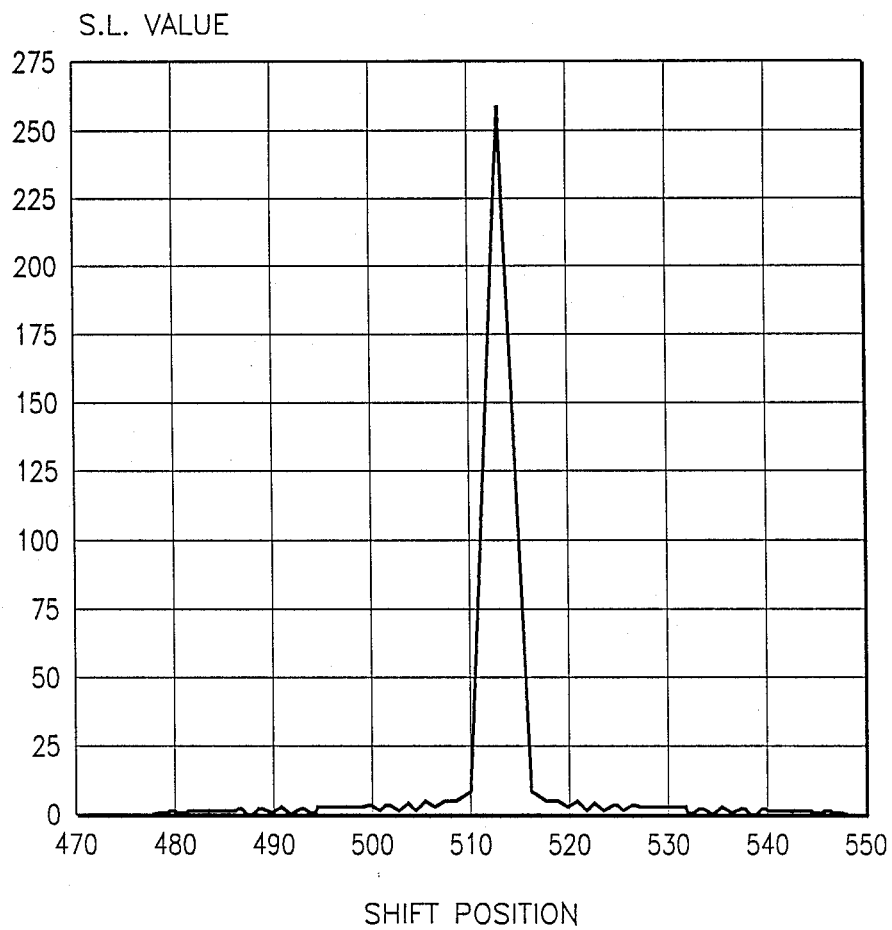

Continuing the example introduced above (PCR=256 and 8-bit multiplies), the result of a Taylor weighted digital chirp waveform is shown in FIG. 3, where each of the code phases is explicitly multiplied by the corresponding Taylor value. Again, note that double sampling places the peak of the pulse in position 512 in the absence of Doppler shift. The worst case rms sidelobe level of the compressed pulse is found to be −43 dB by means of the software developed for this application; of course, the more distant correlation sidelobes are even smaller.

The chip real estate required to realize the decoding multiplies shown in FIG. 1 becomes the limiting factor related to the practicality of implementing a digital correlator in VLSI. The present invention includes apparatus and methods in which the number of bits used to represent the weighted sine and cosine terms can be minimized and/or the multipliers can be replaced by an equivalent group of right shifts and adds. Suppose that the number of multiplier bits is denoted by NBIT. Then the number of non-zero quantization levels that can be used to approximate the multiplier values is denoted by:

$$N\ LEVEL = 2NBIT - 1 - 1$$

where the increment between each level is given by $\frac{1}{2}**(NBIT-1)$. Of course, a quantization error will accompany each representation. The following table shows the result of representing a multiply by four bits:

Multiplication by four bits

| Shifts and Adds | Equiv. Decimal Multiply |
|---|---|
| $\frac{1}{8}$ | 0.1250 |
| $\frac{1}{4}$ | 0.2500 |
| $\frac{1}{4} + \frac{1}{8}$ | 0.3750 |
| $\frac{1}{2}$ | 0.5000 |
| $\frac{1}{2} + \frac{1}{8}$ | 0.6250 |
| $\frac{1}{2} + \frac{1}{4}$ | 0.7500 |
| $\frac{1}{2} + \frac{1}{4} + \frac{1}{8}$ | 0.8750 |

The sine and cosine multiplies of FIG. 1 are implemented by the nearest set of shifts and adds of the above table that approximate that particular trigonometric value thereby eliminating all multiplies from the chip. This implementation is illustrated in FIG. 4 for a three bit multiply approximation.

Figure 4:
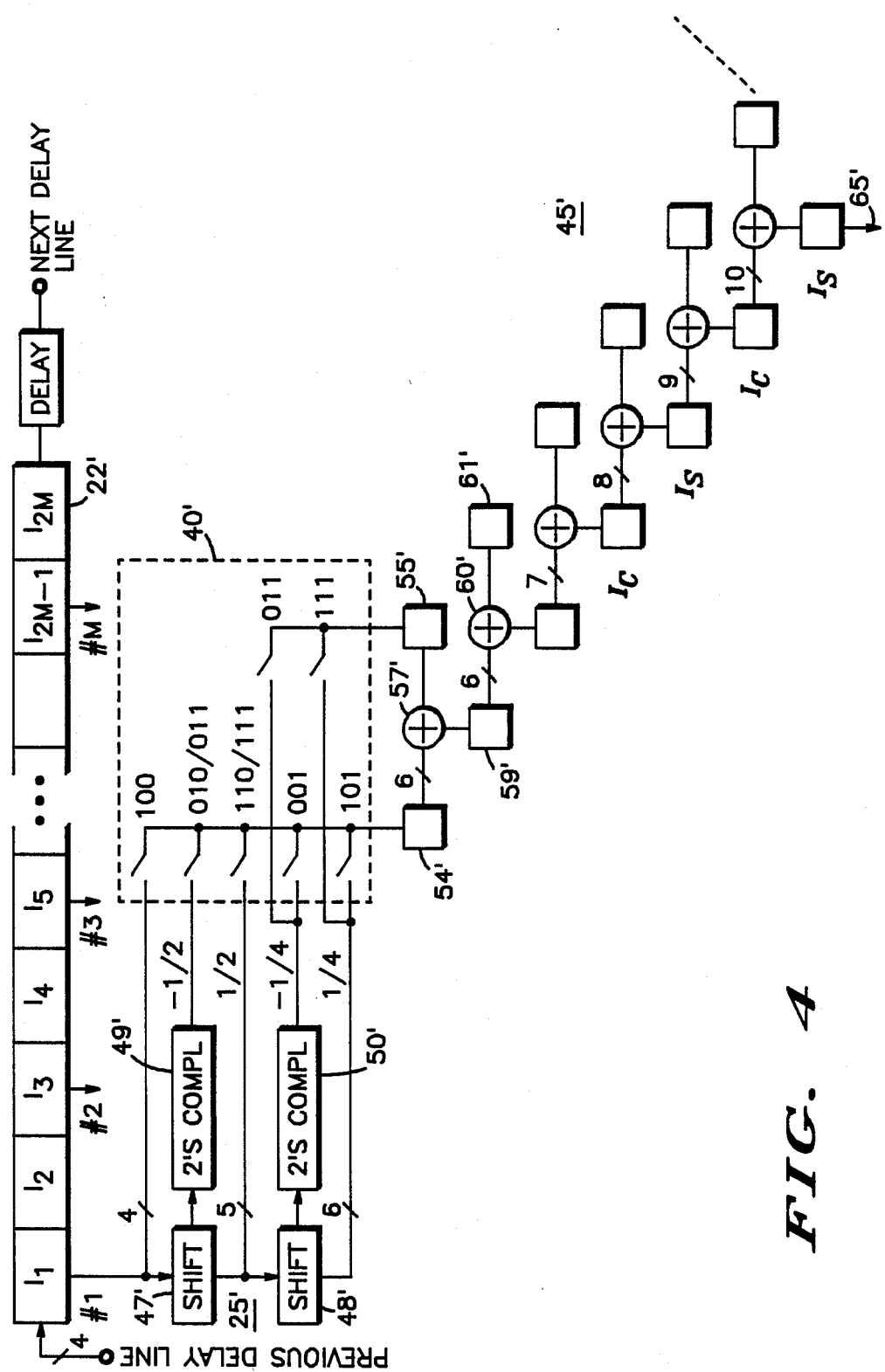
FIG. 4 is a simplified block diagram illustrating shifting and adding portions of the compression process.

Referring specifically to FIG. 4, a simplified block-/schematic diagram of an embodiment of the present invention utilizing shifting and adding is illustrated. The structure of FIG. 4 is more detailed and/or a replacement for portions of the structure illustrated in FIG. 1, with similar parts having the same number and a prime added to indicate the different or additional embodiment. Further, only an I delay line 22' is illustrated for convenience, but it will be understood by those skilled in the art that a similar structure is provided for the Q delay line. Again, only the shifting circuitry for one stage and part of the adding circuitry is illustrated for convenience.

The output of the first stage of the I delay line 22' is coupled to an input of correlator 25', which is in turn coupled to storage device 40' and a summing tree, generally designated 45'. Correlator 25' includes a first digital right shifting circuit 47', a second digital right shifting circuit 48', and two 2's complement adding circuits 49' and 50'. The output of the first stage of I delay line 22' is connected directly to a first output of correlator 25' and to first shifting circuit 47'. The output of shifting circuit 25' is coupled through 2's complement adding circuit 49' to a second output of correlator 25', directly to a third output of correlator 25', and to the input of second shifting circuit 48'. The output of second shifting circuit 48' is couple through 2's complement adding circuit 50' to a fourth output of correlator 25' and, also, directly to a fifth output of correlator 25'. The following values are available at the five outputs of correlator 25':1, $-\frac{1}{2}$, $\frac{1}{2}$, $-\frac{1}{4}$, $\frac{1}{4}$, respectively. The five outputs of correlator 25' are connected to five inputs of storage device 40', which has two outputs that are connected to two different buffer inputs 54' and 55' (or input registers) in the first fold of summing tree 45'. Storage device 40' is a programmable semiconductor memory, such as a PROM, EPROM, or EEPROM, etc. Also, storage device 40' is illustrated in dotted lines to indicate that it may be located on a chip separate from the main chip to provide more room on the main chip and to allow for programmability.

Storage device 40' is essentially a plurality of present switches which couple various correlator outputs, or combinations of correlator outputs, to each of the buffer inputs 54' and 55'. A table of some of the possible values and the functions they represent is set out below.

| Function | Values | Digital Code |
|---|---|---|
| $\cos\theta_{ci}$ | 1 = | 100 |
|  | $\frac{3}{4}$ = | 111 |
| $\sin\theta_{ci}$ | $\frac{1}{2}$ = | 110 |
|  | $\frac{1}{4}$ = | 101 |
| $-\sin\theta_{ci}$ | 0 = | 000 |
|  | $-\frac{1}{4}$ = | 001 |
| $\cos\theta_{ci}$ | $-\frac{1}{2}$ = | 010 |
|  | $-\frac{3}{4}$ = | 011 |

Suppose the input sample consists of four bits and the multiply consists of three bits. At each delay line tap, the sample is right shifted twice in two temporary registers; the outputs represent multiplication by $\frac{1}{2}$ and $\frac{1}{4}$, respectively. The programmable code is a three bit word stored on ROM that includes the sign bit. The adder includes adds for all registers for which the code is "high". The sum is sent to the I or Q accumulator which integrates all partial sums. Note that the number of bits in the temporary shifting registers and the partial accumulators should be consistent with the maximum shift experienced. That is, a three bit multiplier requires two extra shift bits (the fractional part of the shifted word); a four bit multiplier requires three extra shift bits, etc., if full precision of the shift and adds is to be maintained. For the examples cited, these components are six bits each.

Buffer inputs 54' and 55' are coupled to two inputs of an add circuit 57', which has an output that is coupled through a buffer input 59' to an add circuit 60' in the second fold of summing tree 45'. In a similar fashion, a correlator (not shown) coupled to the second stage of I delay line 22' is coupled through another storage unit to the next two buffer inputs in the first fold of summing tree 45'. These two buffer inputs are coupled to a second add circuit (not shown), the output of which is coupled through buffer input 61' to a second input of add circuit 60'. In this manner all of the stages of I delay line 22' are summed into a single output 65'. If the delay line contains M stages, the summing tree will contain 2M-1 add circuits and 4M-1 buffer input circuits.

The various circuits illustrated in FIG. 4 have timing circuits associated therewith so that all of the signals supplied to the first fold (including add circuit 57') are those multiplied (shifted) by one of the quadrature code phase terms, for example $\sin\theta_{ci}$. These terms are then all added and clocked into the second fold of summing tree 45' while signals multiplied by the other of the quadrature code phase terms, for example $\cos\theta_{ci}$, are clocked into the first fold. In this manner there is a continuous flow of data through the correlators and summing tree 45'. Also, data available at output 65' is continuously alternating between equation (1) multiplied (shifted) by one quadrature code phase term and equation (1) multiplied by the second quadrature code phase term. These outputs are combined with similarly multiplied (shifted) equation (2) data in circuits similar to addition circuits 32 and 33 of FIG. 1 so that matching terms simplify and eliminate various components to arrive at outputs similar to equations (3) and (4) above.

Figure 5:
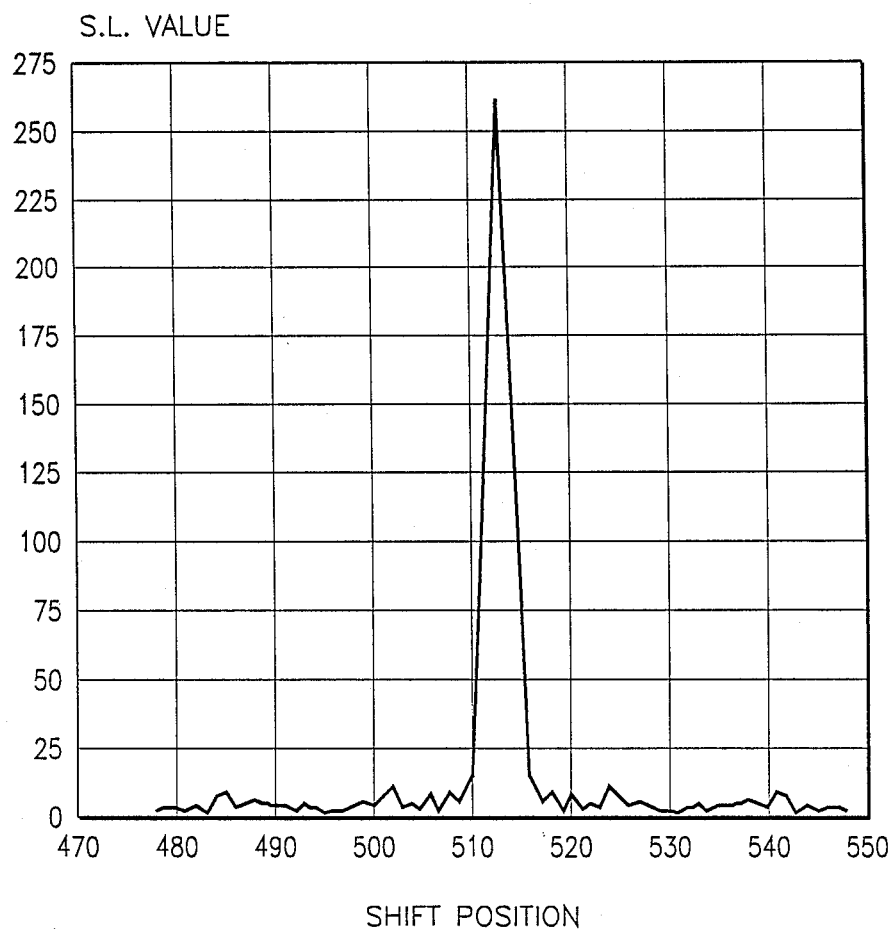
FIGS. 5-7 illustrate waveforms of pulses compressed by utilizing various portions of the present invention.

A sample result of the above procedure is shown in FIG. 5 when as few as three bits are used to represent the multiplies for the pulse compression example being used; that is, an N of 256 with zero Doppler shift across the length of the pulse. Here, Taylor weighting (N=6; −35 dB sidelobes) has been employed. The worst case, nearest sidelobe level is found to be −34 dB. Thus, a digital equivalent of the linear chirp waveform with Taylor weighted sidelobes is achieved by the techniques described above with a three bit equivalent multiplier resulting in worstcase sidelobes of −34 dB or less. Of course, various applications may require more precision than included in this example, but such applications are included within the claims of this disclosure when the quantization levels are implemented as equivalent shifts and adds.

The structures shown in FIGS. 1 and 4 are applicable with either bi-phase or poly-phase coded signals. As previously discussed, these signals suffer significant loss in the presence of Doppler shift. The present poly-phase pulse compressor has the inherent capability of implementing Doppler compensated channels so that bi-phase or poly-phase coded signals can be employed without loss.

To construct Doppler compensated channels, the digital stream is replicated and sent to a number of parallel, tapped delay lines, one for each Doppler channel to be implemented. The multiplying coefficients of each line now include a target Doppler phase term in addition to the code phase term previously described Each phase term is equal to the amount of phase progression resulting from a target possessing a predetermined target velocity. The coefficients assume the following form:

$$\text{or } \frac{SNW(I)}{CSW(I)} = \frac{\sin}{\cos} (\text{code}_i + \delta\theta_i) \, WT_i \tag{5}$$

where SNW(I) or CSW(I) is the i th weighted coefficient, $\delta\theta_i$ is the amount of target phase experienced at the i th stage of the tapped delay line, and $WT_i$ is the chosen weighting function. $WT_i$ is unity except when used for chirp function coefficient. If the total target Doppler phase shift across the pulse is taken to be $\phi_p$ radians, then $$\delta\theta_i = \frac{\phi_p}{kN} - 1 \tag{6}$$

where k is the oversampling factor, N is the pulse compression ratio, and i is the location of the i th stage in the delay line. A separate Doppler compensated channel is implemented for each chosen value of $\phi_p$. The weighted and compensated trigonometric functions are stored on ROM 40 as described above. Note that the various $\delta\theta_i$ are poly-phase residues (modulo $2\pi$) which are directly suited to decoding by the structures described in FIGS. 1 and 4.

The implementation thus requires as many parallel delay lines as needed to encompass the expected target Doppler excursions (illustrated by lines 13 and 17 in FIG. 1), each line having its own set of weighted/compensated trig functions; or, the structures in FIGS. 1 and 4 can be multiplexed by clocking the chip at a very high rate so that the hardware is time-shared in several Doppler channels. The channel with the largest pulse magnitude is the channel which contains the subject target; therefore, a magnitude comparator circuit 42 (see FIG. 1) is included following the pulse summing networks.

Figure 6:
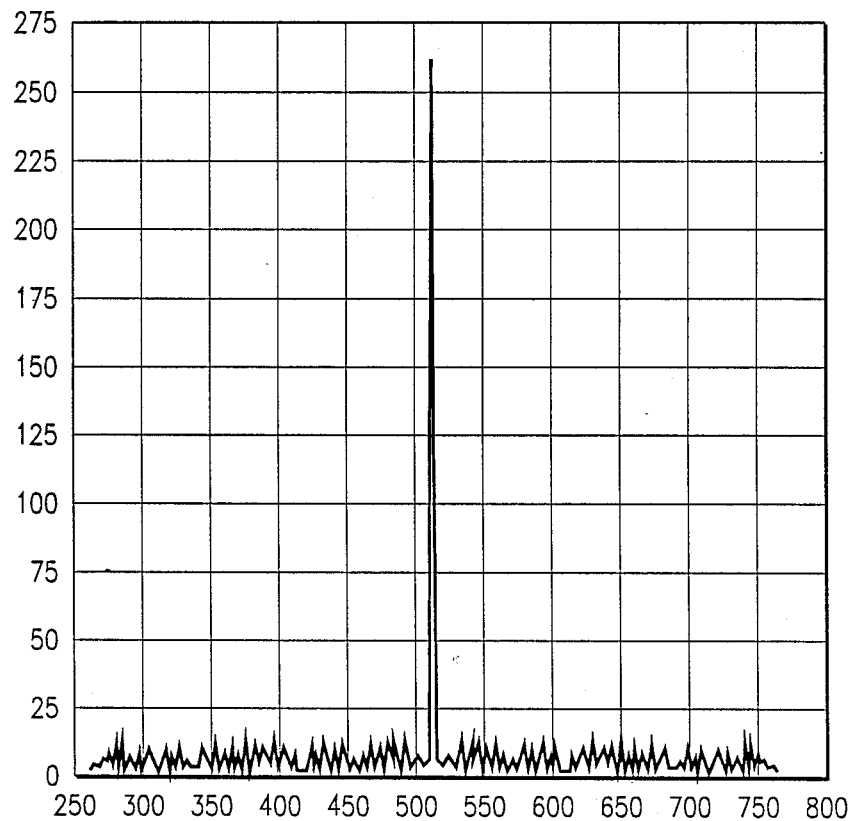
Figure 7:
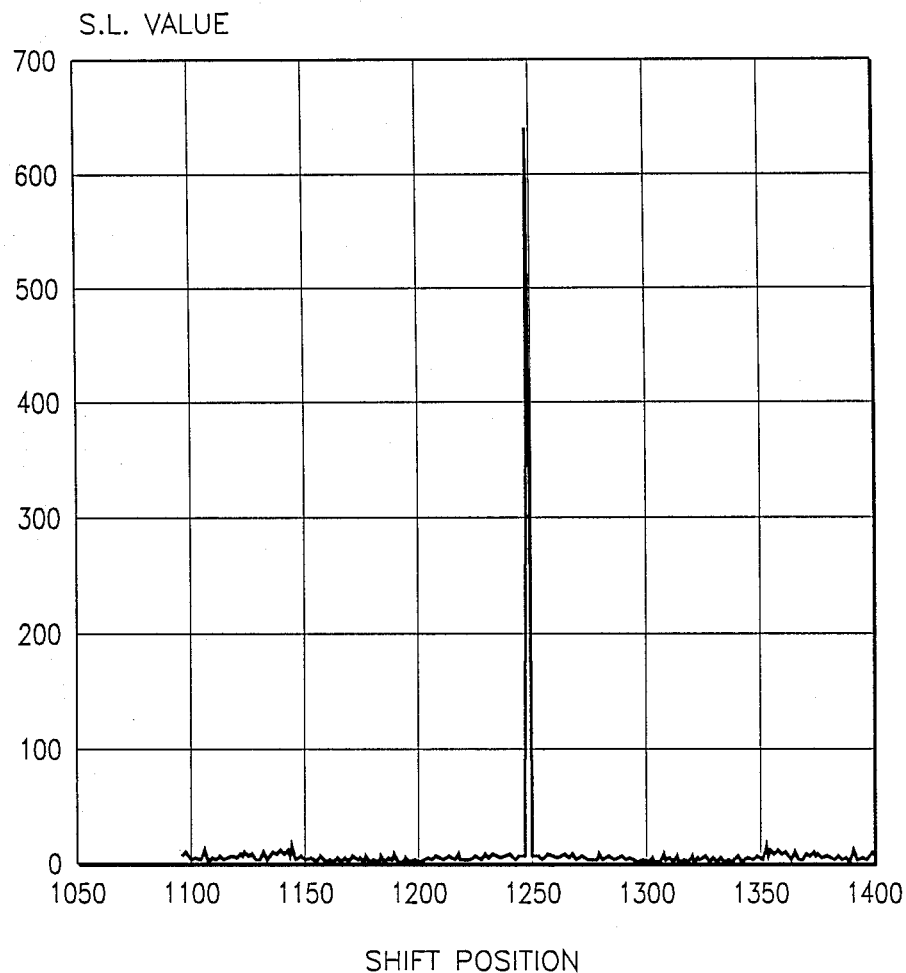

Examples of the pulse compression capability of the structures embodying the present invention for other poly-phase codes are shown in FIGS. 6 and 7. FIG. 6 shows the results for a bi-phase encoded pulse of code length 255. The channel is Doppler matched at 90° and has an rms sidelobe level of −32.6 dB for the close-in sidelobes. FIG. 7 represents a case taken from codes in GF(5) (codes with five element states) of code length 624. The rms sidelobes for this case are more than −40 dB down from the peak. Note that the channel has also been Doppler matched and three bit multipliers have been employed in the correlation coefficients. Thus, it is demonstrated that all waveforms that can be represented as poly-phase encoded signals are applicable to the basic pulse compression structures disclosed herein.

Figure 8:
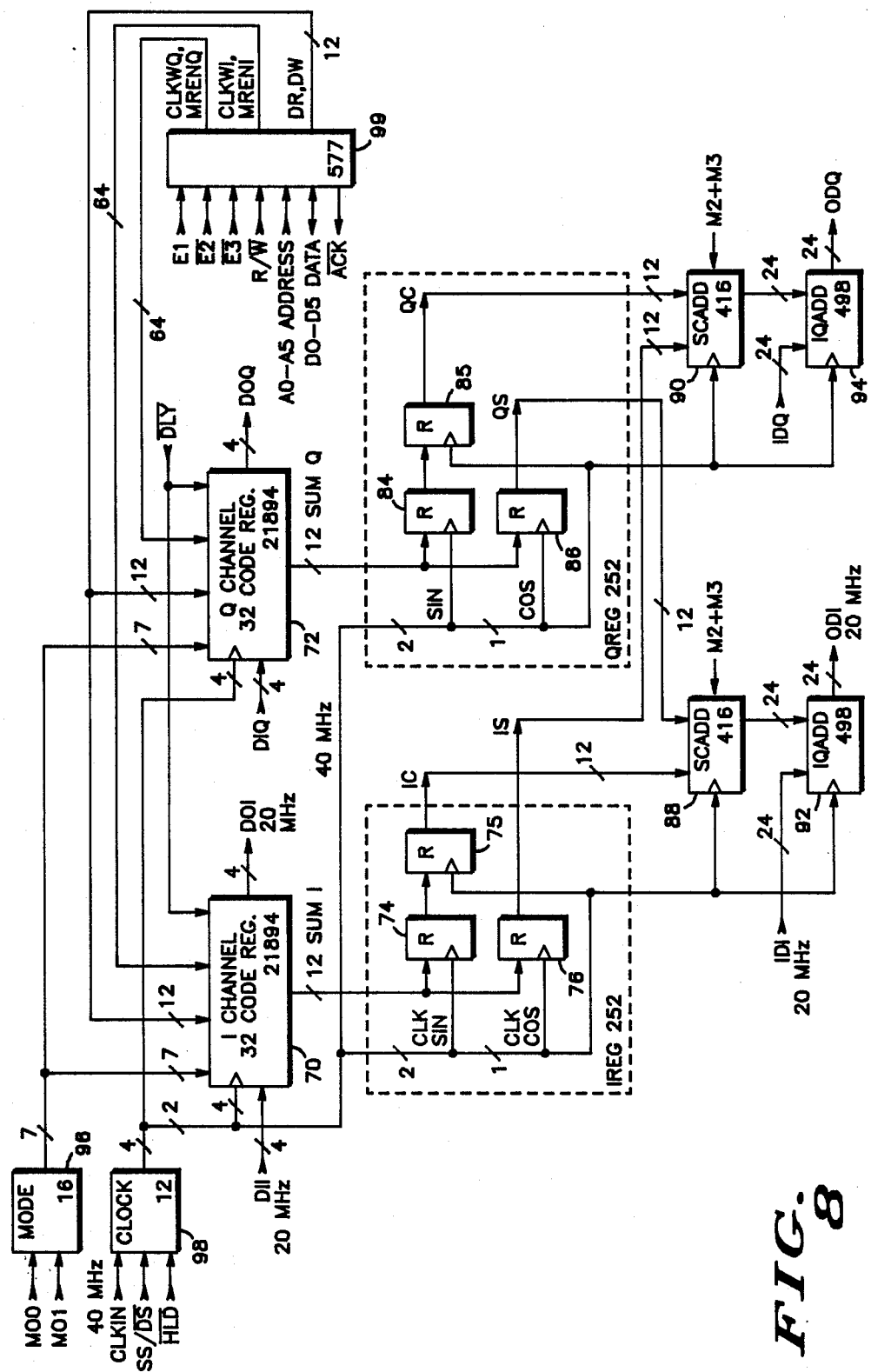
FIG. 8 is a schematic diagram of a poly-phase convolver chip embodying the present invention; an FIG. 9 is a more detailed schematic diagram of a portion of FIG. 8.

FIG. 8 illustrates the schematic of a poly-phase convolver, or pulse compression, chip. The chip includes a I channel delay line (32 code register) with shift and add circuitry 70, a similar Q channel circuit 72, I channel storage and timing registers 74–76, similar Q channel storage and timing registers 84–86, an I channel crosscouple adding circuit 88, a Q channel cross-couple adding circuit 90, and final I and Q summing circuits 92 and 94, respectively. The chip also contains a mode control circuit 96, a clock circuit 98, and a read/write control circuit 99, which are all believed to be self explanatory to those skilled in the art and will not be explained further herein, except that the mode control circuit 96 provides the means whereby a given code is clocked into the necessary storage locations on the chip.

Figure 9A:
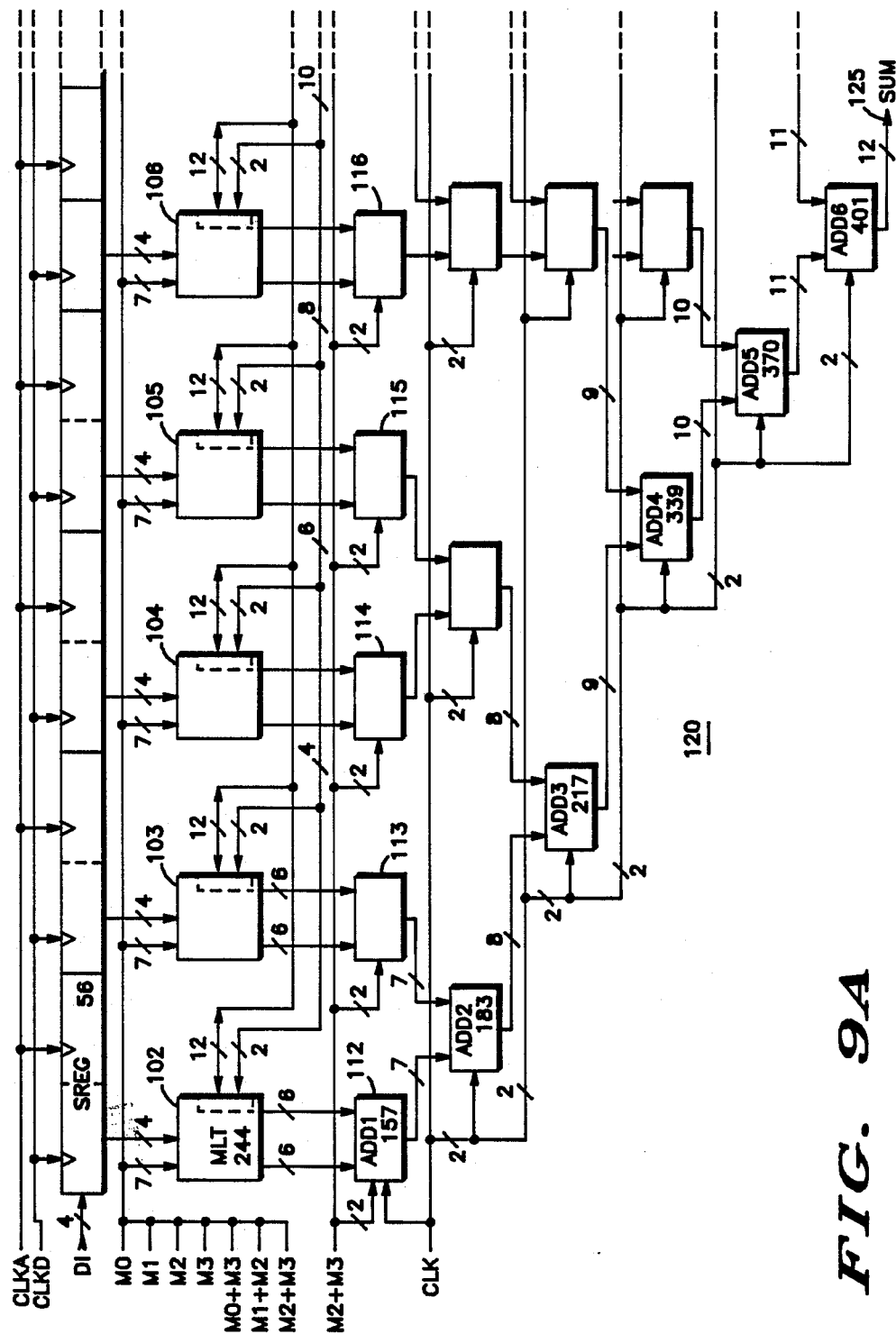
Figure 9B:
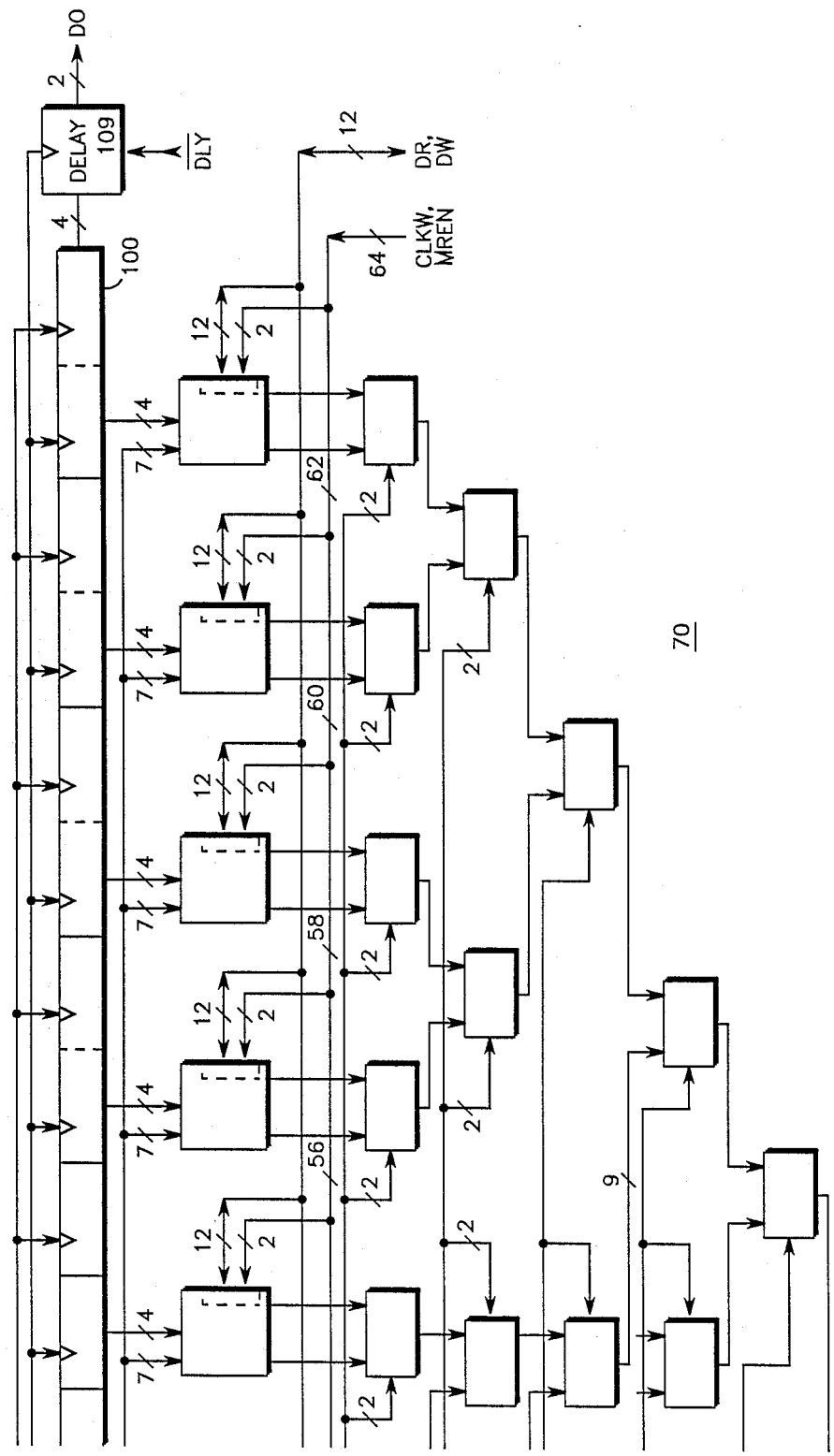

The I channel delay line with shift and add circuitry 70 is illustrated in more detail in FIG. 9. A 32 bit shift register 100 is illustrated with the outputs of alternate stages connected to digital shifting circuits 102-106. It will be noted that the circuit is broken in the middle for convenience of illustration and only the left half of the figure is described. Each of the shifting circuits 102-106 has two output lines connected to add circuits 112-116, respectively, which add circuits form the first fold of a summing tree 120. An output 125 of summing tree 120 is connected to inputs of both registers 74 and 76 of FIG. 8. As previously explained in conjunction with FIG. 4, the I samples of the quadrature input signal (equation 1) are multiplied first by one of the quadrature code phase signals of the storage circuit and supplied to the add circuits in the first fold of summing tree 120 while the quadrature input signal is being multiplied by the other of the quadrature code phase signals of the storage circuit Referring to FIG. 8, a first signal from summing tree 120 is clocked into register 74. A second signal from summing tree 120 is then clocked into register 76, while the first signal is being clocked into register 75. The two shifted signals from registers 75 and 76 are then clocked, simultaneously, into cross couple adding circuits 88 and 90, respectively. At the same time shifted signals from registers 86 and 85 are clocked, simultaneously, into cross couple adding circuits 88 and 90, respectively The matching quadrature functions are added to eliminate the code and simplify the functions to arrive at an I digital sample. All samples are added in summing circuit 92 to arrive at the final compressed pulse component.

The current invention, a digital poly-phase pulse compressor, eliminates the need to implement analog pulse compressors. Furthermore, very long pulses with high pulse compression ratios can be processed in digital form. The input pulse can contain target Doppler shifts. Also, all of the waveform parameters are adaptable by selection by the system designer. In addition, the device is fully compatible with any type of phase encoded waveform: ordinary bi-phase codes, linear-/non-linear chirp, Frank codes, or generic poly-phase codes having "p-roots of unity". Finally, the architecture of the implementation is suitable for realization via a variety of VLSI technologies: macrocells, compacted gate arrays, or fully custom chips.

While the invention has been shown and described in conjunction with specific embodiments of this invention, further modifications and improvements will occur to those skilled in the art. It should be understood, therefore, that this invention is not limited to particular forms shown; the appended claims intend to cover all modifications which do not depart from the spirit and scope of this invention.

What I claim is:

1. In a system utilizing coded pulse expansion implementing $K \times N$ digital samples during transmission, where K is a constant positive integer and N is the pulse compression ratio, digital poly-phase pulse compression apparatus in a receiver comprising:

means for receiving expanded pulses and converting the received pulses to two, quadrature baseband signals;

in-phase (I) and quadrature (Q) analog-to-digital (A/D) converters each connected to receive a different one of the two quadrature baseband signals and convert the received one to a digital signal;

I and Q KN stage delay lines connected to receive the digital signals from said I and Q A/D converters, respectively, and each provide $K \times N$ digital samples of each received pulse, said I delay line providing a digital sample including a mode phase term at each of its $K \times N$ stages and said Q delay line providing a matching digital sample at each corresponding one of its $K \times N$ stages;

storage means having quadrature code phase signals stored therein;

N I correlator means coupled to the K th stages of said I delay line and said storage means and N Q correlator means coupled to the K th stages of said Q delay line and said storage means, each of said correlator means coupled to a different K th stage of said delay lines, each of said I and Q correlator means including digital shifting circuitry for providing a pair of quadrature functions representing the product of quadrature code phase signals and corresponding to one of $K \times N$ digital samples available at the coupled stage; and adding and combining means coupled to said I and Q correlator means for combining pairs of quadrature functions from the I correlator means with matching pairs of quadrature functions from the Q correlator means to provide I and Q compressed pulse components 2. In a system utilizing coded pulse expansion implementing $K \times N$ digital samples during transmission, where K is a constant positive integer and N is the pulse compression ratio, digital poly-phase pulse compression apparatus in a receiver as claimed in claim 1 wherein the adding and combining means includes adding means coupled to each of said correlator means for adding the pair of quadrature functions from each of said N I, correlator means with a matching pair of quadrature functions from each of said N I correlator means to provide N I digital samples and N Q digital samples with the code phase terms eliminated, and I and Q summing means coupled to said adding means for summing the digital samples from said adding means to provide I and Q compressed pulse components.

3. In a system utilizing coded pulse expansion implementing $K \times N$ digital samples during transmission, where K is a constant positive integer and N is the pulse compression ratio, digital poly-phase pulse compression apparatus in a receiver as claimed in claim 1 wherein the adding and combining means includes I and Q digital combining means coupled to said I and Q correlator means, respectively, for receiving the pairs of quadrature functions and providing an I combined signal and a Q combined signal, and adding means coupled to said I and Q digital combining means for adding the and Q combined signals, respectively, to provide I and Q compressed pulse components.

4. In a system utilizing coded pulse expansion implementing $K \times N$ digital samples during transmission, where K is a constant positive integer and N is the pulse compression ratio, digital poly-phase pulse compression apparatus in a receiver as claimed in claim 1 wherein the storage means includes programmable storage means connected to provide weighted sine and cosine values.

5. In a system utilizing coded pulse expansion implementing K×N digital samples during transmission, where K is a constant positive integer and N is the pulse compression ratio, digital poly-phase pulse compression apparatus in a receiver as claimed in claim 4 wherein the weighted sine and cosine values include Doppler compensation terms in addition to the code phase terms.

6. In a system utilizing coded pulse expansion implementing K×N, digital samples during transmission, where K is a constant positive integer and N is the pulse compression ratio, digital poly-phase pulse compression apparatus in a receiver as claimed in claim 4 wherein the weighted sine and cosine values include chirp weighting functions in addition to the code phase terms.

7. In a system utilizing coded pulse expansion implementing K×N digital samples during transmission, where K is a constant positive integer and N is the pulse compression ratio, digital poly-phase pulse compression apparatus in a receiver as claimed in claim 4 wherein the programmable storage means includes a ROM, PROM, or EPROM type memory.

8. In a system utilizing coded pulse expansion implementing K×N digital samples during transmission, where K is a constant positive integer and N is the pulse compression ratio, digital poly-phase pulse compression apparatus in a receiver as claimed in claim 3 wherein the combining means includes an I summing tree having a plurality of folds of interconnected summing circuits with an input connected to each of the I correlator means and an output, and a Q summing tree having a plurality of folds of interconnected summing circuits with an input connected to each of the N Q correlator means and an output.

9. In a system utilizing coded pulse expansion implementing K×N digital samples during transmission, where K is a constant positive integer and N is the pulse compression ratio, digital poly-phase pulse compression apparatus in a receiver as claimed in claim 8 wherein the combining means includes timing means coupled to each of said summing trees and each of the correlator means for supplying one of the pair of quadrature functions from the correlator means to a first fold of the coupled summing tree and moving the supplied one of the pair of quadrature functions to a second fold of the summing tree as the other one of the pair of quadrature functions is coupled to the first fold of the summing tree.

10. In a system utilizing coded pulse expansion implementing K×N digital samples during transmission, where K is a constant positive integer and N is the pulse compression ratio, digital poly-phase pulse compression apparatus in a receiver as claimed in claim 9 wherein the combining means further includes I and Q digital adding circuits each having two inputs and an output, with one input of each adding circuit coupled to the output of the I summing tree and the other input of each adding circuit coupled to the output of the Q summing tree, and the timing means further includes circuitry for simultaneously supplying the pairs of quadrature functions from the summing trees to the I and Q digital adding circuits.

11. In a system utilizing coded pulse expansion implementing K×N digital samples during transmission, where K is a constant positive integer and N is the pulse compression ratio, digital poly-phase pulse compression apparatus in a receiver as claimed in claim 1 wherein said apparatus is incorporated into a VLSI semiconductor chip.

12. In a system utilizing coded pulse expansion implementing K×N digital samples during transmission, where K is a constant positive integer and N is the pulse compression ratio, digital poly-phase pulse compression apparatus in a receiver as claimed in claim 3 wherein the digital shifting circuitry in each of said correlators includes at least two digital shifting circuits coupled in series, with outputs from each of the shifting circuits being provided directly and through two 2's complement adding circuits.

13. In a system utilizing coded pulse expansion implementing K×N digital samples during transmission, where K is a constant positive integer and N is the pulse compression ratio, digital poly-phase pulse compression apparatus in a receiver as claimed in claim 12 wherein the direct outputs and the 2's complement outputs of the digital shifting circuits are coupled through the storage means to the combining means and the storage means includes a plurality of preset switches which couple a predetermined combination of the outputs to the adding and combining means.

14. In a system utilizing coded pulse expansion implementing K×N digital samples during transmission, where K is a constant positive integer and N is the pulse compression ratio, digital poly-phase pulse compression apparatus as claimed in claim 13 wherein the preset switches include a programmable semiconductor storage device formed on a single chip and the remainder of the apparatus is formed on a separate, single semiconductor chip.

15. In a system utilizing coded pulse expansion implementing K×N digital samples during transmission, where K is a constant positive integer and N is the pulse compression ratio, digital poly-phase pulse compression apparatus as claimed in claim 1 wherein K has a value greater than 1.

16. In a system utilizing one of bi-phase and poly-phase coded pulse expansion implementing K×N digital samples during transmission, where K is a constant positive integer and N is the pulse compression ratio, digital poly-phase pulse compression apparatus in a receiver adapted to receive transmissions including a Doppler component due to relative movement of a target comprising:

means for receiving expanded transmitted pulses including a Doppler component produced by relative movement of a target and converting the to two, quadrature baseband signals;

in-phase (I) and quadrature (Q) analog-to-digital (A/D) converters each connected to receive a different one of the two quadrature baseband signals and convert it to digital signals;

a first plurality of parallel, tapped K×N stage delay lines, one for each Doppler channel to be implemented with the number of Doppler channels to be implemented corresponding to predetermined target Doppler excursions and with each delay line connected to receive the digital signals from said I A/D converter;

a second plurality of parallel, tapped KN stage delay lines, one for each Doppler channel to be implemented with the number of Doppler channel to be implemented corresponding to predetermined target Doppler excursions and with each delay line connected to receive the digital signals from said Q A/D converter;

N correlators coupled to each of said first and second pluralities of delay lines, one correlator being coupled to every K th stage in each delay line, said correlators each being constructed to provide a pair of quadrature functions representing the product of a code phase signal and corresponding to one of the K×N digital samples at the coupled output, said correlators each including programmable storage means containing sine and cosine values weighted with code phase and target phase terms and multiplier means coupled to receive a preselected one of the weighted sine and cosine values and the digital signals from the coupled stage of the delay line;

adding means coupled to each of said N correlators coupled to said first plurality of delay lines for adding the pair of quadrature functions from each of said correlators with a matching pair of quadrature functions from each of said N correlators coupled to said second plurality of delay lines to provide N I digital samples and N Q digital samples with the code phase eliminated for each of said first plurality of delay lines;

summing means coupled to said adding means for summing each of the N digital samples to provide compressed pulse components; and magnitude comparator means coupled to each of said summing means for receiving the compressed pulses and selecting the Doppler channel with the largest pulse magnitude.

17. In a system utilizing coded pulse expansion implementing K×N digital samples during transmission, where K is a constant positive integer and N is the pulse compression ratio, a digital poly-phase pulse compression method comprising the steps of:

receiving expanded transmitted pulses and converting them to two, quadrature baseband analog signals;

converting the two, quadrature baseband analog signals to in-phase (I) and quadrature (Q) digital signals;

separating the I and Q digital signals into N I digital samples and N Q digital samples;

storing weighted sine and cosine values in a memory;

utilizing the stored, weighted sine and cosine values to shift and add each of the N I digital samples and each of the N Q digital samples to provide pairs of I quadrature functions and pairs of Q quadrature functions;

combining the pairs of I quadrature functions with matching pairs of the Q quadrature functions to provide I digital samples and Q digital samples with code phase terms eliminated; and adding the I digital samples from the combining step and the Q digital samples from the combining step to provide I and Q compressed pulse components.

* * * * *

UNITED STATES PATENT AND TRADEMARK OFFICE
CERTIFICATE OF CORRECTION

PATENT NO. : 4,833,479

DATED : May 23, 1989

INVENTOR(S) : Eric J. Carlson

It is certified that error appears in the above-identified patent and that said Letters Patent is hereby corrected as shown below:

In column, 10, claim 1, line 10, the word "mode" should be changed to --code--.

In column 10, claim 2, line 40, delete the comma following "I".

In column 10, claim 2, line 42, the letter "I" following "N" should be changed to --Q--.

In column 10, claim 3, line 58, insert --I-- before the word "and" (second occurrence).

In column 11, claim 8, line 29, insert --N-- before "I".

In column 12, claim 16, line 62, the word "channel" should be changed to --channels--.

Signed and Sealed this

Thirteenth Day of February, 1990

Attest:

JEFFREY M. SAMUELS

*Attesting Officer*     *Acting Commissioner of Patents and Trademarks*